(12) United States Patent
Nasr

(10) Patent No.: US 7,521,814 B2
(45) Date of Patent: Apr. 21, 2009

(54) SYSTEM AND METHOD FOR PROVIDING LOW VOLTAGE 3-PHASE POWER IN A VEHICLE

(75) Inventor: Nader Nasr, Neenah, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 683 days.

(21) Appl. No.: 10/950,718

(22) Filed: Sep. 27, 2004

(65) Prior Publication Data

US 2006/0066109 A1 Mar. 30, 2006

(51) Int. Cl.
*B60L 11/00* (2006.01)

(52) U.S. Cl. .................................................. 290/40 C

(58) Field of Classification Search .................. 310/184
See application file for complete search history.

(56) References Cited

U.S. PATENT DOCUMENTS

| | | | | |
|---|---|---|---|---|
| 3,517,766 A | * | 6/1970 | De Witt | 180/65.4 |
| 4,045,718 A | * | 8/1977 | Gray | 320/123 |
| 4,117,390 A | * | 9/1978 | Iwata et al. | 322/90 |
| 4,328,427 A | * | 5/1982 | Bond | 290/3 |
| 4,451,054 A | * | 5/1984 | Allison | 280/104 |
| 5,705,859 A | * | 1/1998 | Karg et al. | 290/45 |
| 5,735,215 A | * | 4/1998 | Tegeler | 105/34.1 |
| 6,209,672 B1 | * | 4/2001 | Severinsky | 180/65.2 |
| 6,421,593 B1 | * | 7/2002 | Kempen et al. | 701/48 |
| 6,481,516 B1 | * | 11/2002 | Field et al. | 180/65.2 |
| 6,661,109 B2 | * | 12/2003 | Fukasaku et al. | 290/40 C |
| 6,700,242 B2 | * | 3/2004 | Kawamura | 310/68 R |
| 6,787,959 B2 | * | 9/2004 | Weimer | 310/184 |
| 6,830,117 B2 | * | 12/2004 | Chernoff et al. | 180/65.1 |
| 6,863,149 B2 | * | 3/2005 | Shimizu | 180/446 |
| 6,864,606 B2 | * | 3/2005 | Rose, Sr. | 310/74 |

FOREIGN PATENT DOCUMENTS

| | | | |
|---|---|---|---|
| DE | 19619865 A1 | * | 11/1997 |
| EP | 1229636 A2 | * | 8/2002 |
| EP | 1329351 A1 | * | 7/2003 |
| JP | 02142400 A | * | 5/1990 |
| JP | 09074701 A | * | 3/1997 |
| JP | 11341606 A | * | 12/1999 |
| WO | WO 03055714 A1 | * | 7/2003 |

\* cited by examiner

*Primary Examiner*—Joseph Waks
(74) *Attorney, Agent, or Firm*—Foley & Lardner LLP

(57) ABSTRACT

A vehicle including a principal power unit that includes a generator coupled to a prime mover. The generator includes at least first and second sets of windings to generate power. The first set of windings is configured to generate power at a first voltage and the second set of windings is configured to generate power at a second voltage that is different from the first voltage.

24 Claims, 4 Drawing Sheets

US 7,521,814 B2

SYSTEM AND METHOD FOR PROVIDING LOW VOLTAGE 3-PHASE POWER IN A VEHICLE

FIELD OF THE INVENTION

The present invention relates generally to systems and methods for providing power in electric and/or hybrid electric vehicles and, more particularly, to a system and method for providing low voltage 3-phase power in an electric or hybrid electric vehicle.

BACKGROUND OF THE INVENTION

In a conventional electric vehicle, a prime mover, such as a gasoline powered engine, is used to drive an electric generator or alternator which supplies high voltage electric current to a plurality of motors. The motors typically are coupled to wheel sets on the vehicle.

The prime mover drives the motor that typically produces a high voltage A/C current. The high voltage A/C current is then fully rectified with the resulting D/C current and voltage being distributed to current inverters coupled to the traction motors. Such systems are highly integrated with each of the components typically designed and manufactured to operate with the other components in the overall system. Such vehicles have multiple components associated with the change of A/C to D/C to A/C power. Maintenance of such systems is expensive since specific components having tolerances associated with the high voltage must be used.

The high-voltage A/C power also requires the use of a step-down transformer to provide power to operate low-voltage ancillary equipment on or associated with the electronic vehicle such as pumps, instruments, tools, lights and other equipment. The use of step down transformers is expensive and requires additional maintenance.

Thus, there is a need for an electric vehicle that is configured to provide low voltage 3-phase power in addition to high-voltage power. There is a further need for an electric vehicle that utilizes A/C power generated on the vehicle without converting the A/C power to D/C power. There is also a need for electric vehicle that can be updated and upgraded as new technology and components become available without a required redesign of the overall vehicle system.

SUMMARY OF THE INVENTION

One embodiment of the invention relates to a vehicle. The vehicle includes a principal power unit that includes a generator coupled to a prime mover. The generator includes at least first and second sets of windings to generate power. The first set of windings is configured to generate power at a first voltage and the second set of windings is configured to generate power at a second voltage that is different from the first voltage.

Another embodiment of the invention relates to a vehicle. The vehicle includes a vehicle support structure, a plurality of wheels rotatably supported by the vehicle structure, wherein at least two of the wheels are steerable, at least one electric motor coupled to at least one of the wheels, a high voltage A/C power bus including at least two phase conductors, wherein the phase conductors are coupled to the principal power unit, a low voltage A/C power bus including at least two phase conductors, wherein the phase conductors are coupled to the principal power unit, a power storage unit coupled to the AC power bus, a vehicle controller coupled to the electric motor and the AC power bus, a data bus coupled to the vehicle controller, and a principal power unit supported by the structure. The principal power unit includes a generator including at least first and second sets of windings to generate power. The first set of windings generates power at a first voltage and the second set of windings generates power at a second voltage that is different from the first voltage.

Yet another embodiment of the invention relates to a vehicle. The vehicle includes a principal power unit including a generator. The generator includes at least first and second sets of windings to generate power. The first set of windings generates power at a first voltage and the second set of windings generates power at a second voltage that is different from the first voltage. The vehicle further includes at least four wheels including rubber tires. At least two of the wheels are driven by the first voltage. Further, the second voltage is not used to drive the vehicle.

DETAILED DESCRIPTION OF THE PREFERRED EMBODIMENTS

Figure 1:
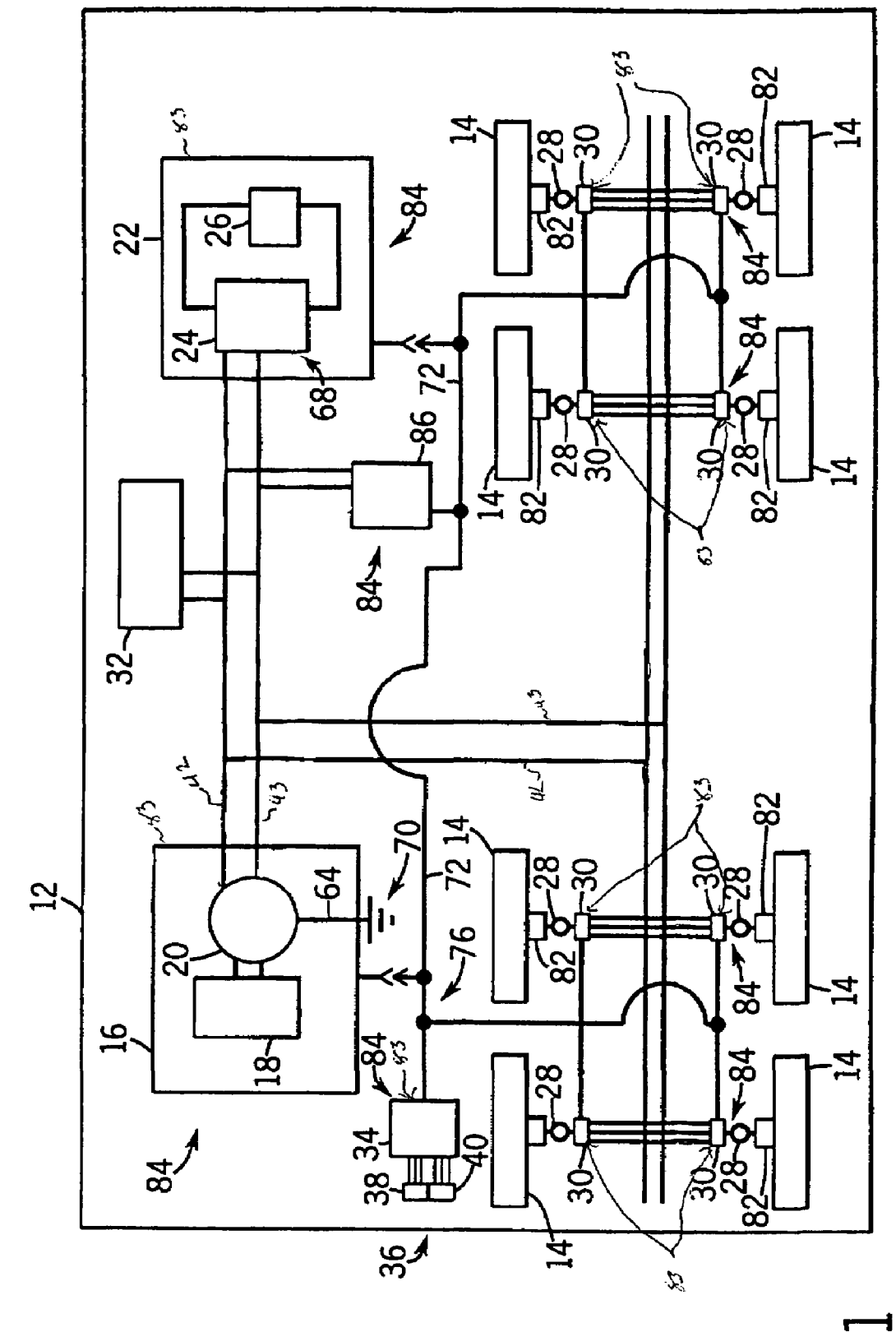
FIG. 1 a schematic diagram of an exemplary embodiment of an electric vehicle providing an exemplary embodiment of a high voltage A/C bus assembly and a low voltage A/C bus assembly variously coupled to various modules on the vehicle.

Referring now to FIG. 1, an electric vehicle 10 is shown comprising a vehicle platform or vehicle support structure 12 supporting various modules 83, according to an exemplary embodiment. Electric vehicle 10 may be an electric or a hybrid electric vehicle. According to one exemplary embodiment, vehicle 10 may be a refuse vehicle including a refuse box supported by the vehicle. According to another exemplary embodiment, vehicle 10 may be a load handling vehicle including a load handling system for moving a load onto and off of vehicle 10.

Modules 83 may be any device or system coupled to vehicle 10 and configured for utilizing or generating power. Modules 83 may be either permanently or removably coupled to vehicle 10. Modules 83 may include both high-voltage modules 84 and low-voltage modules 86. High-voltage modules 84 are modules that typically utilize high voltage power during operation. Low voltage modules 86 are modules that typically utilize low voltage power during operation and are accordingly power by the low voltage.

Exemplary high-voltage modules 84 include a principal power unit 16, a power storage unit 22, an electric motor 28 coupled to at least one wheel 14 of the vehicle 10, a drive controller 30 coupled to the electric motor 28, an energy dissipation unit 32, and a vehicle controller 34 having a user interface 36.

Exemplary low-voltage modules 86 include a cooling system and cooling system components. Alternative low voltage modules 86 may include any low-voltage ancillary equipment on or associated with the electronic vehicle such as pumps, instruments, tools, lights and other equipment. Low voltage modules 86 may include any type of module coupled to the vehicle and configured to utilize low-voltage power.

Interconnecting the modules 83 on electric vehicle 10 is a high voltage A/C power bus assembly 42, a low-voltage A/C power bus assembly 43, and a data bus network 76 through which the vehicle and its various functions are controlled and operated. Specific high-voltage modules 84 and low-voltage modules 86 and their functions will be described hereinafter.

One embodiment of electric vehicle 10 comprises the vehicle platform 12 and a principal power unit 16 coupled to the vehicle platform 12. A power storage unit 22 may also be coupled to the vehicle platform 12. Vehicle platform 12 further includes a plurality of wheels 14 rotatably coupled to vehicle platform 12 with an electric motor 28 coupled to at least one wheel 14. A drive controller 30 is coupled to electric motor 28. A continuous track, supported by the wheels 14 can also be provided.

A vehicle controller 34 having an input terminal 38 and an output 40 terminal is coupled to drive controller 30 and data bus network 76. The vehicle controller 34 receives data input from monitors and sensors, as well as from the operator input terminal 38, concerning the speed and power required for vehicle 10 operations. The torque output of each motor 28 may be adjusted to meet the requirements established in vehicle controller 34 from such data input.

Coupling the principal power unit 16, the power storage unit 22, and the electric motor 28 through the drive controller 30 is A/C high-voltage power bus assembly 42. In some instances, vehicle controller 34 is coupled to one of principal power units 16 and power storage unit 22 as determined by an operator of electric vehicle 10.

Figure 2:
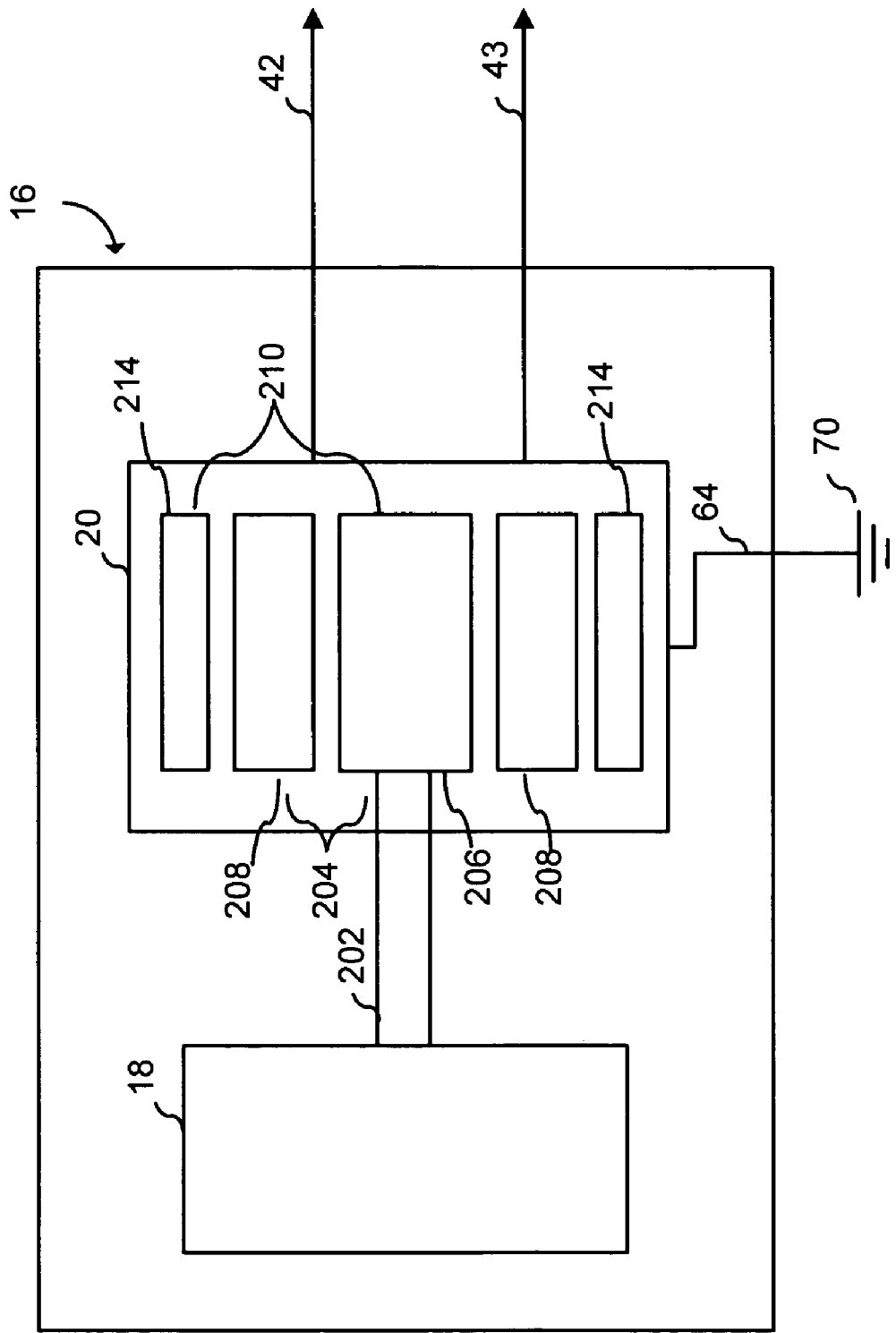
FIG. 2 is a schematic diagram of the principal power unit of the vehicle of FIG. 2 in greater detail, according to an exemplary embodiment.

Referring now to FIG. 2, a block diagram illustrating the principal power unit 16 in greater detail is shown, according to an exemplary embodiment. Principal power unit 16 includes a prime mover or engine 18 coupled to a generator or motor 20. The prime mover 18 may be a fuel cell, a gas turbine, an internal combustion engine, a nuclear power device or any other system configured to provide a mechanical rotation output along a prime mover output shaft 202.

The generator 20 is coupled to the prime mover and receives the mechanical rotation output of prime mover 18 along prime mover output shaft 202 as a mechanical input. Generator 20 includes both a first set of windings 204, including rotor winding 206 and first winding stator 208 and a second set of windings 210 including winding rotor 206 and second winding stator 214. Rotor winding 206 may be coupled to prime mover output shaft 202 such that prime mover output shaft 202 imparts rotational energy to rotor winding 206. Generator 20 may further include additional sets of windings as needed. The at least two sets of windings are configured to produce three phase A/C power for the electric vehicle 10 and/or auxiliary equipment associated with vehicle 10. For example, according to an exemplary embodiment, vehicle 10 may serve as a power source, allowing external equipment to be coupled to vehicle 10 such as to receive power from vehicle 10. According to an exemplary embodiment, generator 20 may be a motor/generator configured to operate as a motor in certain configurations.

According to an exemplary embodiment generator 20 is a synchronous generator producing 460 to 480 volt, three phase A/C 60 Hz power using first set of windings 204 and voltage that is less than 50 volt, preferably 20 to 44 volt, three phase A/C power using second set of windings 210 for the electric vehicle 10. Accordingly, generator 20 is configured to produce both high voltage power and low voltage power.

Although specific voltage are described, it is contemplated that different sized generators or alternators can be coupled to the prime mover for purposes of generating either higher or lower electrical power in either or yet another set of windings. For instance, a single phase system can be utilized or a system that generates 720 volt power system can be used or a system that operates at a frequency other than 60 Hz, such as 50 Hz which is typical in European countries.

High voltage power may be provided as an output from generator 20 on high voltage A/C power bus assembly 42, and low voltage may be provided as an output on low-voltage A/C power bus assembly 43. Although generator 20 may be configured to provide both high and low voltage power, it is also contemplated that the power generated by any winding of the principal power unit 16 can be modified by appropriate modules such as a step-down transformer to provide power at a required voltage to operate ancillary equipment on or associated with the electric vehicle 10 such as pumps, instruments, tools, lights and other equipment.

Figure 3:
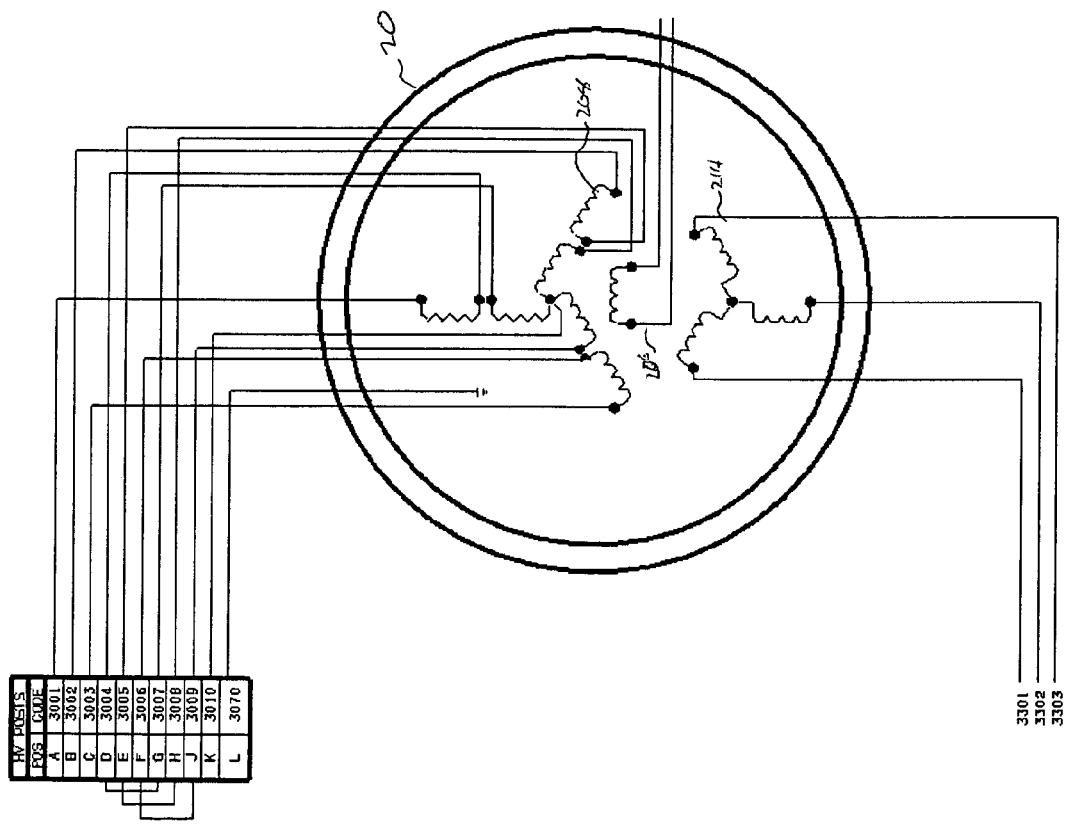
FIG. 3 is a circuit diagram illustrating the electric circuit implemented by the generator of FIG. 2 in producing both high voltage three phase power and low voltage three phase power, according to an exemplary embodiment.

Referring now to FIG. 3, an electrical schematic diagram 300 illustrating the electric circuit implemented by generator 20 in producing both high voltage three phase power and low voltage three phase power is shown, according to an exemplary embodiment. Generator 20 includes the high-voltage set of windings 204 and the low-voltage set of windings 210. According to an exemplary embodiment, as shown in FIG. 3, generator is a three phase synchronous generator.

High-voltage set of windings 204 may be terminated on the vehicle and distributed to the traction components of vehicle 10. As further described above with reference to FIG. 2, high-voltage set of windings 204 includes rotor winding 206 and first winding stator 208.

Low-voltage set of windings 210 may be terminated on the vehicle and distributed to the low voltage modules of vehicle 10. As further described above with reference to FIG. 2, low-voltage set of windings 210 includes rotor winding 206 and first winding stator 214.

Referring again to FIG. 1, alternative embodiments of an electric vehicle 10 are based on the number of wheels 14 that are driven on the vehicle 10. For instance, one embodiment includes an electric motor 28 and drive controller 30 coupled to another wheel 14 and coupled to the data bus network 76 and the high voltage A/C bus assembly 42. The vehicle 10 can also include four electric motors 28 and four drive controllers 30 which are coupled to four wheels 14 and coupled to the data bus network 76 and the high voltage A/C bus assembly 42. As shown in FIG. 1, at least 8 electric motors 28 and electric drive controllers 30 can be coupled to 8 separate wheels 14 and coupled to the data bus network 76 and the high voltage A/C bus assembly 42. In all variances of the electric vehicle 10, at least two of the wheels are steerable. According to an exemplary embodiment, the wheels include rubber tires.

The high voltage A/C bus assembly 42 includes a plurality of phase conductors. A first conductor together with a second conductor can be configured together with a neutral to provide single phase power in one embodiment of the vehicle 10. A third conductor can be used in conjunction with the first conductor and the second conductor to provide three phase power. The conductors can be stranded metal wire such as copper or aluminum sized and clad to transmit the power generation contemplated in the vehicle 10 design. The conductors can also be solid metal bars, generally referred to as bus bars, composed of appropriate clad metals, such as copper or aluminum, as will be appreciated by one ordinarily skilled in the art.

The electric motor 28 can be an appropriate sized traction motor. An exemplary embodiment of an electric vehicle 10 will provide an A/C, three phase induction electric motor. The electric motor may include a simple cast rotor, machine mount stator, and sealed ball bearings. The electric motor may include no brushes, internal switches or sliding contact devices with the rotor as the only moving part of the traction motor. Control of the electric motor is achieved through a drive controller 30 which is coupled to the motor. The torque output of the motor 28 is adjusted based on the rotational speed and power requirements established by the operator at the vehicle controller 34 and transmitted to the drive controller 30 over the data bus network 76. The drive control 30 is coupled by a data bus 72 into a data bus network 76 which is connected to the vehicle controller 34. Signals generated by the vehicle controller 34, and the drive controller 30 and other modules including auxiliary modules 86 and sensors are processed by the vehicle controller 34 with appropriate input 38 and output provided by the user interface 36. It is also contemplated that wireless communication between the vehicle controller 34 and the various modules 84 can be achieved including communication of signals via radio waves, microwaves, and fiber optical paths including relay via satellite to a central command center.

Figure 4:
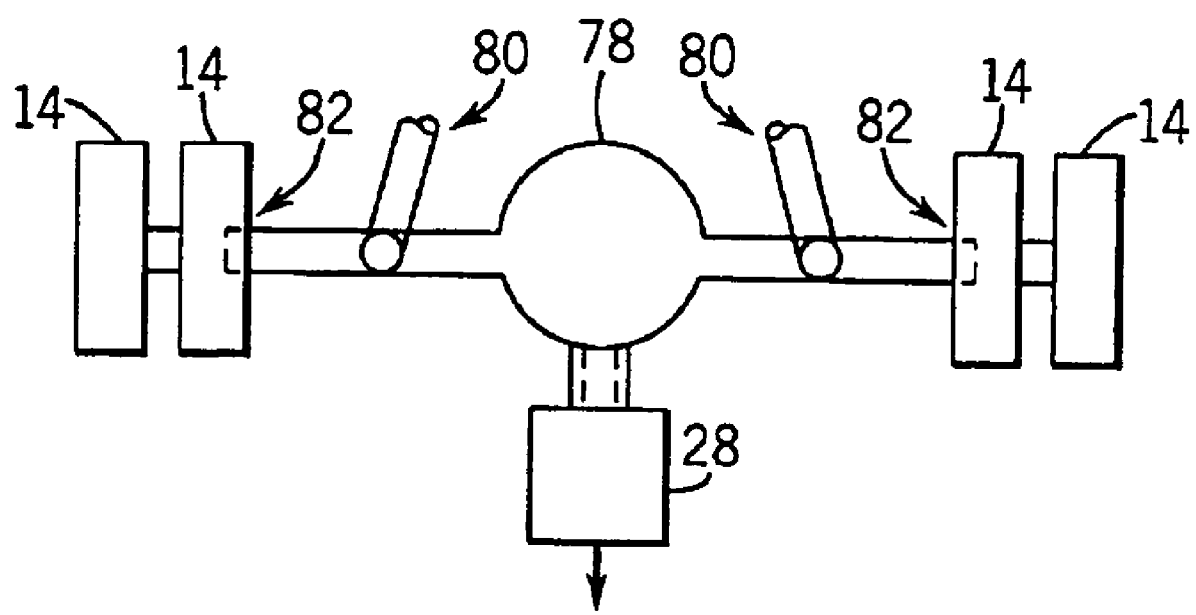
FIG. 4 is a top plan view illustration of an exemplary embodiment of a differential assembly coupled to an electric motor for driving at least two wheels and supported by a suspension assembly.

FIG. 1 further illustrates the wheels 14 being driven directly by an electric motor 28 through an appropriate wheel-end reduction assembly 82 if necessary. A wheel-end reduction assembly 82 can also couple the wheels 14 to a differential assembly 78 via drive shafts. A plurality of wheel-end reduction assemblies 82 can couple the wheels 14 to their respective electric motors 28. Another embodiment of the vehicle 10 includes a differential assembly 78 coupled to the electric motor 28 for driving at least two wheels 14 as shown in FIG. 4. Additional differential assemblies 78, such as three assemblies 78, with each differential assembly coupled to an electric motor 28 for driving at least two wheels, can also be configured in the vehicle 10.

As mentioned above, the vehicle 10 can be provided with the principal power unit 16, the power storage unit 22, the electric motor 28, the drive controller 30, the vehicle controller 34, the suspension assembly 80 and other associated equipment as modules 83 that may be removably coupled to the vehicle platform. The modules 83 are also removably connected to the data bus network 76 and the high voltage A/C bus assembly 42 and/or low voltage A/C bus assembly 43. A low voltage module 86 can be any type of equipment or tool required or associated with the function and operation of the vehicle 10. For example, the low voltage module can be a pump, a saw, a drill, a light, etc. The low voltage module 86 is removably connected to the data bus network 76 and the low voltage A/C bus assembly 43. A high voltage junction 88 is used to facilitate the connection of the high voltage modules 84 to the data bus network 76 and the high voltage A/C power bus assembly 42 and are located at convenient locations throughout the vehicle 10. A low voltage junction 89 is used to facilitate the connection of the modules 86 to the data bus network 76 and the low voltage A/C power bus assembly 43 and are located at convenient locations throughout the vehicle 10. The junctions 88 and 89 can accommodate various types of connections such as quick connectors, nuts and bolts, solder terminals, or clip terminals or the like. The junction 88 can accommodate the data bus 72 or the phase conductor 44 or both. Advantageously, the connectors and components associated with low voltage A/C power bus assembly 89 are not required to handle as much power and are generally less expensive. Further, both the low voltage and high voltage power may be distributed throughout the vehicle.

Also connected to the high voltage A/C power bus assembly 42 is the power storage unit 22. The power storage unit 22 includes an electric power converter 24 and an energy storage device 26. The energy storage unit 22 can be configured to provide electric power above and beyond that required of the principal power unit 16. The energy storage device 26 can be electric capacitors, storage batteries, a flywheel, or hydraulic accumulators. The electric power converter 24 can be configured to convert the A/C power generated by the principal power unit 16 to D/C power and transfer such converted power to an appropriate storage device. The electrical power converter 24 can also convert the energy stored in the energy storage device 26 back to A/C power to augment and supplement the A/C power generated by the principal power unit 16 over the A/C power bus assembly 42. Applicants have determined that an additional 200-300 horse power of short-term power can be provided into the A/C power bus assembly 42 over the phase conductors by discharge of an on-board battery pack (energy storage device 26) under control of the power storage unit 22. The power storage unit 22 may be coupled to the data bus network 76 and controlled by the vehicle controller 34. The combined electrical power from the principal power unit 16 and the power storage unit 22 will all be available on the high voltage A/C power bus assembly 42 for use by the electric motors 28 or by any other module 84 as determined by the operator at the user interface 36 of the vehicle controller 34.

Vehicle 10 may be further configured to include a low voltage power storage unit configured to operate similarly to power storage unit 22 or to configured power storage unit assembly 22 such that high and/or low voltage may be stored.

In operation, the power storage unit 22 receives power from the principal power unit 16 over the conductors of the high voltage A/C power bus assembly 42. The power received is converted into the appropriate energy mode required by the energy storage device 26 and maintained in the energy storage device 26 until required during the operation of the vehicle 10. If the principal power unit 16 is not functioning for any reason, the energy in the power storage unit can be utilized to operate, for a given period of time, the vehicle 10 or any of the modules 84 or auxiliary modules 86 coupled to the vehicle 10.

Energy storage recharge of the power storage unit 22 by the principal power unit 16 will begin automatically and immediately after the vehicle 10 arrives at its destination and will continue during the vehicle's return run to its original location. The state of charge of the power storage unit 22 will be maintained between missions by a simple plug connection to a power receptacle in the vehicle's garage or storage location, which receptacle will automatically disconnect as the vehicle 10 leaves such site. The power storage unit 22 can also receive energy generated by the electric motors 28 when the motors are configured in a regeneration mode in which case they will function as a generator. Such functionality is utilized in a braking procedure for the vehicle is determined by the operator at the user interface 36 of the vehicle controller 34. The electric motor 28 and high voltage AC power bus assembly 42 can also be configured to regenerate power back to the principal power unit 16.

An additional module 84 that is provided in another embodiment of the vehicle 10 is an energy dissipation unit 32 coupled to the high voltage A/C bus assembly 42 and the data bus network 76. If it is determined that the principal power unit 16 or the electric motors 28 or any other auxiliary module 86 generating too much power or are not utilizing sufficient power, the excess power can be dissipated through the energy dissipation device 32. An example of an energy dissipation device 32 is a resistive coil that may be additionally cooled by fans or an appropriate fluid. Another example of an energy dissipation unit 32 is a steam generator which utilizes excess heat generated in the vehicle to heat water to produce steam.

Thus, there is provided an electric vehicle of modular design with the modules interconnected by an A/C bus assembly and a data bus network. Although the invention has been described in conjunction with specific embodiments, thereof, it is evident that many alternatives, modifications and variations will be apparent to those ordinarily skilled in the art. For example, an electric vehicle using a modular component design can be utilized as a refuse vehicle, a load handling vehicle, or one that can negotiate severe off-road terrain. The vehicle can also be used in a military configuration with the ability to negotiate extreme side slopes and negotiate extreme maneuvers at high speeds. The modular aspect of the vehicle architecture will allow for optimum placement of components to maximize performance with regard to center of gravity which will facilitate its operational capabilities. Accordingly, it is intended to embrace all such alternatives, modifications and variations that fall within the spirit and scope of the appended claims.

What is claimed is:

1. An electric vehicle, comprising:
    a plurality of wheels rotatably supported by a vehicle platform;
    an electric motor coupled to at least one wheel;
    a drive controller coupled to the electric motor;
    a vehicle controller coupled to the drive controller and a data bus network; and
    a principal power unit including a generator coupled to a prime mover, the generator including at least first and second sets of windings to generate power, the first set of windings generating power at a first voltage and the second set of windings generating power at a second voltage that is different from the first voltage,
    wherein the electric motor is driven by the first voltage, and wherein the vehicle controller is coupled to one of the principal power unit and a power storage unit.

2. The vehicle of claim 1, wherein the first set of windings is configured to generate high voltage three phase power and the second set of windings is configured to generate low voltage three phase power.

3. The vehicle of claim 2, wherein the high voltage is 460 to 480 volt, three phase A/C power and wherein the low voltage is 20 to 44 volt three phase A/C power.

4. The vehicle of claim 2, further including a high voltage A/C bus assembly configured to distribute the high voltage three phase power to at least one high voltage module positioned on the electric vehicle.

5. The vehicle of claim 4, further including a low voltage A/C bus assembly configured to distribute the low voltage three phase power to at least one low voltage module positioned on the electric vehicle.

6. The vehicle of claim 1, including another electric motor and drive controller coupled to another wheel and coupled to the data bus network and the high voltage A/C bus assembly.

7. The vehicle of claim 1, wherein at least eight electric motors and eight drive controllers are coupled to eight wheels and coupled to the data bus network and A/C bus assembly.

8. The vehicle of claim 1, including a differential assembly coupled to the electric motor for driving at least two wheels.

9. The vehicle of claim 1, wherein the principal power unit, a power storage unit, the electric motor, the drive controller, and the vehicle controller are modules removably coupled to the vehicle platform and removably connected to the data bus network and the high voltage A/C bus assembly.

10. The vehicle of claim 9, including a low voltage module removably connected to the data bus network and the low voltage A/C bus assembly.

11. An electric vehicle, comprising:
    a vehicle support structure;
    a plurality of wheels rotatably supported by the vehicle structure, wherein at least two of the wheels are steerable;
    at least one electric motor coupled to at least one of the wheels;
    a high voltage A/C power bus including at least two phase conductors, wherein the phase conductors are coupled to a principal power unit;
    a low voltage A/C power bus including at least two phase conductors, wherein the phase conductors are coupled to the principal power unit;
    a power storage unit coupled to the high voltage AC power bus;
    a vehicle controller coupled to the electric motor and the high voltage AC power bus;
    a data bus coupled to the vehicle controller; and
    a principal power unit supported by the structure, wherein the principal power unit includes a generator, the generator including at least first and second sets of windings to generate power, the first set of windings generating power at a first voltage and the second set of windings generating power at a second voltage that is different from the first voltage,
    wherein the electric motor is driven by the first voltage;
    wherein a first set of windings is configured to generate high voltage three phase power and a second set of windings is configured to generate low voltage three phase power;
    wherein the high voltage A/C bus is configured to distribute the high voltage three phase power to at least one high voltage module positioned on the electric vehicle, and the low voltage A/C bus is configured to distribute the low voltage three phase power to at least one low voltage module positioned on the electric vehicle.

12. The vehicle of claim 11, wherein the high voltage is 460 to 480 volt, three phase A/C power and wherein the low voltage is 20 to 44 volt three phase A/C power.

13. The vehicle of claim 11, including another electric motor and drive controller coupled to another wheel and coupled to the data bus network and the high voltage A/C bus assembly.

14. The vehicle of claim 11, wherein at least eight electric motors and eight drive controllers are coupled to eight wheels and coupled to the data bus network and the high voltage A/C bus assembly.

15. The vehicle of claim 11, including a differential assembly coupled to the electric motor for driving at least two wheels.

16. The vehicle of claim 11, wherein the principal power unit, the power storage unit, the electric motor, the drive controller, and the vehicle controller are modules removably coupled to the vehicle platform and removably connected to the data bus network and the high voltage A/C bus assembly.

17. The vehicle of claim 16, including a low voltage module removably connected to the data bus network and the low voltage A/C bus assembly.

18. The vehicle of claim 11, wherein the vehicle controller is coupled to one of the principal power unit and the power storage unit.

19. An electric vehicle, comprising:
    a principal power unit including a generator, the generator including at least first and second sets of windings to generate power, the first set of windings generating high voltage three phase power and the second set of windings generating low voltage three phase power;

a low voltage A/C bus assembly configured to distribute the low voltage three phase power to at least one low voltage module positioned on the electric vehicle; and at least four wheels including rubber tires, wherein at least two of the wheels are driven by the high voltage three phase power, wherein the low voltage three phase power is not used to drive the electric vehicle.

20. The vehicle of claim 19, wherein the high voltage is 460 to 480 volt, three phase A/C power and wherein the low voltage is 20 to 44 volt three phase A/C power.

21. The vehicle of claim 19, further including a high voltage A/C bus assembly configured to distribute the high voltage three phase power to at least one high voltage module positioned on the electric vehicle.

22. The vehicle of claim 19, wherein the electric vehicle further includes a cooling system including at least a cooling fan, and wherein the cooling fan is powered by the second voltage.

23. The vehicle of claim 19, wherein the electric vehicle includes a refuse box supported by the vehicle.

24. The vehicle of claim 19, wherein the vehicle includes a load handling system for moving a load onto and off of the vehicle.

* * * * *